April 3, 1951  G. A. COLLINS ET AL  2,546,978
WELL LINER AND METHOD OF CEMENTING
Filed Feb. 18, 1946

INVENTORS
George A. Collins
John R. Russell
Francis L. Colahan

By J. H. Adams
Walter G. Miller

ATTORNEYS

Patented Apr. 3, 1951

2,546,978

UNITED STATES PATENT OFFICE 2,546,978

WELL LINER AND METHOD OF CEMENTING

George A. Collins, Whittier, John R. Russell, La Habra Heights, and Francis L. Colahan, Whittier, Calif., assignors, by mesne assignments, to California Research Corporation, San Francisco, Calif., a corporation of Delaware Application February 18, 1946, Serial No. 648,252

6 Claims. (Cl. 166—1)

1

This invention relates to a metal liner which extends below a cemented casing in a deep well, such as an oil or gas well, and is perforated at its lower end to admit desired fluids; and is particularly directed to a method and apparatus for cementing the splice or annular space between the lower end of said well casing and the upper end of said liner extending above the outer cemented casing and inside of the latter to prevent the admission of undesired fluids.

Heretofore it has been the practice to cement liners by pumping cement through perforations or ports immediately above the fluid-admission perforations in the lower portion of the liner, the cement rising through the annulus around the upper or unperforated portion of the liner until it reached the splice or overlap between the liner and the already-cemented well casing. This procedure, as well as modifications thereof that are familiar to those skilled in this art, gave as many as 70% failures at the splice, requiring recementing and testing and additionally delaying the successful completion of the well.

Due to the higher unit weight of the fluid cement, about 120 pounds per cubic foot, as compared with the drilling mud which may be only about half of that value, the extra pressure against the formations open to the well may rise to a point where circulation is entirely lost, that is, as fast as the cement is pumped downwardly it will penetrate unconsolidated strata and not reach the desired location in the well. This is particularly true in cases where attempts are made to cement the full length of long liners, for example, upwardly of several hundred feet in length in an attempt to cause the cement to rise into the splice between the already-cemented casing and the upper end of the liner.

This invention comprehends broadly cementing the splice between the casing and the upper end of the liner separately from any previous or subsequent cementing operation upon either the casing or the lower portion of the liner, and is particularly intended to prevent loss of cement to porous or low pressure formations intersected by the well bore below the already-cemented casing, in this example by providing flow-control means on said liner to engage said casing above its lower end and cement-directing means for displacing positively cement and mud-fluid or the like above the flow-directing means when the cement is placed in the intended location in the splice.

It is an object of this invention to provide a method and means for cementing the splice between a casing and a liner extending therefrom downwardly into a well bore.

2

Another object is to provide a method and means that will deposit fresh and uncontaminated cement in the splice or annulus formed by the overlapping casing and liner of a deep well.

Another object is to provide an improved construction for the upper end of a well liner which is adapted to cooperate with an already-cemented casing to direct and control the flow of cement into the splice and insure a fluid-tight seal.

These and other objects and advantages will be further apparent from the following description and the accompanying drawings, which illustrate a preferred embodiment of the invention.

Figure 1:
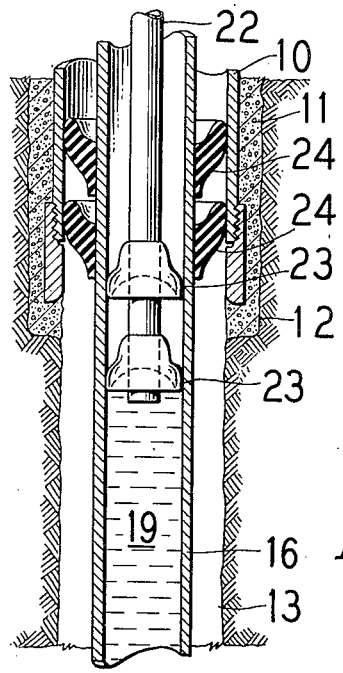
Figure 1 is a vertical sectional view of the lower or perforated end of a well liner, showing one arrangement for cementing that portion into a well bore above the fluid-producing formation.

Referring to the drawings, reference numeral 10 designates the well casing which has been cemented as at 11 into the enlarged well bore at 12 to form a fluid-tight seal or water shutoff. Well bore 13 extends downwardly through formations 14 which it is desired selectively to exclude from production. The lower portion of liner 16 may be provided with slots or perforations 17 for the desired distance, these latter being open to the productive formation 15 to admit fluid to the liner. Under certain conditions liner 16 may be left blank or unperforated throughout its entire length until after all of the cementing operations have been completed, whereupon it may be gun-perforated or otherwise placed in communication with the desired productive formation.

Above the slots 17 is a baffle or valved plug means 18, which may be integral with liner 16 or may be selectively placed by means operable from the surface. Ports 20 are provided for the valved passage through plug 18 to permit cement 21 introduced through injection tubing 22 to flow outwardly and upwardly and seal the annulus between the blank portion of liner 16 and the formations 14 for a desired distance, depending upon the individual well. Under certain circumstances liner 16, which may be several hundred or even a thousand feet long, may be cemented throughout its entire length to seal off all formations intersected by well bore 13 below the water shutoff 12 of casing 10. In this example the cement is illustrated as extending only a short distance upwardly along liner 16. The lower end of cement-conducting tubing 22 is provided with downwardly concave swab cups 23 to direct the cement downwardly and out of ports 20.

Normally the cement 21 is displaced downwardly through liner 16 by means of a column of mud fluid 19 to a point only a few feet above plug 18. This cement is permitted to stand in and around liner 16 for a few hours until it has attained its initial set. During this period of time the mud fluid 19 is shut-in from the surface to prevent further displacement or movement of either the fluid or cement 21.

The upper end of liner 16, at a point located above the lower end of already-cemented well casing 10, is provided externally with flow-control means, in this example one or more upwardly-concave swab cups 24, which are adapted to cooperate with the wall of casing 10 to permit upward flow of mud-fluid and the like which is present in well bore 13, around liner 16 as it is introduced into the bore. Cups 24, by virtue of their shape, will act effectively to prevent subsequent downward flow or loss of circulating mud-fluid or of cement into low pressure formations. The cement in this operation will seal or splice the upper end of liner 16 to the lower end of casing 10 to make a fluid-tight joint.

Figure 2:
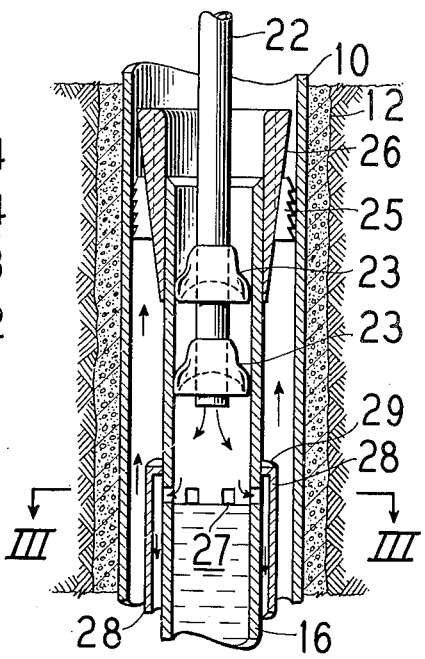
Figure 2 is a vertical sectional view of the upper end of the liner of Figure 1, illustrating the present invention.
Figure 2:
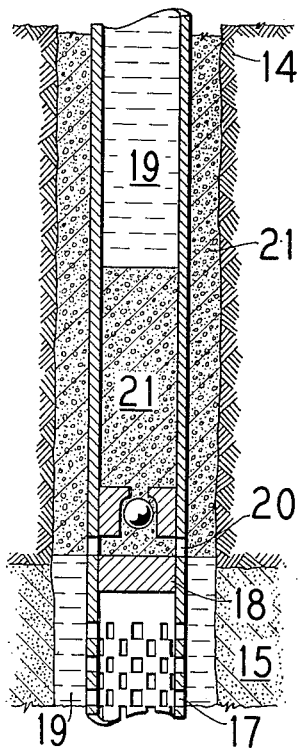
Figure 3:
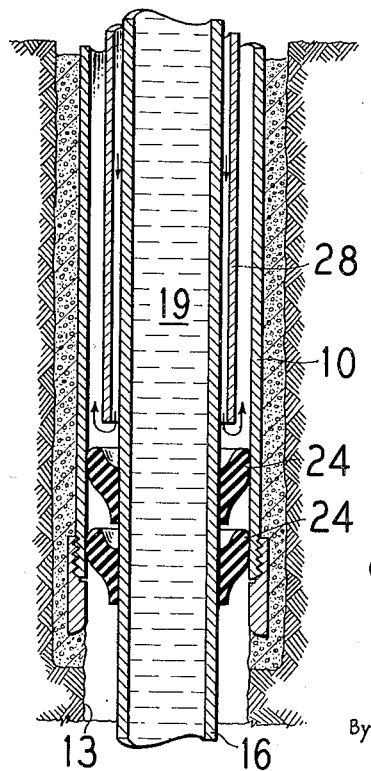
Figure 3 is a transverse sectional view on line III—III of the view of Figure 2 illustrating a concentric flow-directing sleeve surrounding the outlet ports for cementing the liner within the lower portion of the already-cemented well casing.
Figure 3:
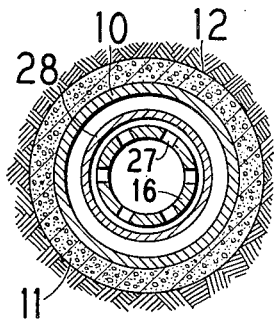

The second step which is illustrated in Figure 2 of the drawing consists in elevating tubing 22 to bring swab cups 23 from a point below ports 27 in liner 16 to a point where cups 23 will be substantially at the upper end of liner 16 and above ports 27. This figure illustrates one arrangement for supporting liner 16 within casing 10 by means such as slips 25 which cooperate with a liner support means generally designated 26, usually designed with longitudinal grooves to permit free passage of fluid or cement in either direction. It is immaterial to this invention whether liner support means 26 are provided at the upper end of liner 16 or whether the liner is otherwise supported in the well, as by extending to the extreme lower end of well bore 13. An essential feature, however, is that there shall be an overlap of the liner 16 within the already-cemented casing 10 to accommodate the means which will be described below for placing cement within the so-called splice.

Ports 27 are positioned a short distance below the upper end of liner 16 and are surrounded by a concentric sleeve 28, the latter making a fluid-tight joint 29 with the outer face of liner 16 at a point above ports 27. Desirably, sleeve 28 extends downwardly for about 5 to 20 feet or more to a point just above swab cups 24 as shown in the lower part of Figure 2. Cement passing downwardly through tubing 22 is directed outwardly through the wall of liner 16 through ports 27 and is then further directed downwardly by sleeve 28 to emerge uniformly around its lower edge, displacing upwardly drill mud, cuttings and the like which may be present, and thoroughly cleaning the annular space between liner 16 and the lower end of the already-cemented well casing 10 throughout the entire annular space, obviating the channelling that would take place if cement merely emerged directly from ports 27. Cement is prevented from passing downwardly through the annulus into low pressure formations below the shoe of outer casing 10 by the flexible rubber cups 24 which form a selective, pressure-tight seal against the outer casing against the downward movement of fluid, but do not hinder upward passage of fluid while circulating and placing the first or primary batch of cement through ports 20 (Figure 1). After the cement is placed in the splice as just described, tubing 22 may be withdrawn and the cement permitted to harden after which that portion within liner 16 above the perforations is drilled out in the customary manner.

A particular function of sleeve 28, in addition to the prevention of channelling as described above, is to provide adequate vertical separation between ports 27 and the lower end of the cement in the splice above cups 24. It has been found that, if ports 27 are placed closely adjacent cups 24, the short length of cement which acts as a seal between the ports and the space below cups 24 is often inadequate to prevent high pressure fluids from entering the casing from formations which are open to well bore 13 below the cups.

Although a single embodiment of this invention has been illustrated and described, and only one method of practicing it has been set forth, it is to be understood that numerous modifications and changes in the apparatus and in the procedure outlined could be made without departing from this invention, and all such changes as are included within the scope of the appended claims are embraced thereby.

We claim:

1. The combination with a well liner positioned in a well bore and extending from a point above the lower end of an already-cemented well casing to a point below the lower end of the casing, of flow control means secured on the outside of said liner at a level above the lower end of the casing for permitting fluid flow upwardly through the casing around said liner and for preventing downward fluid flow therearound, a port in said liner longitudinally spaced above said flow control means and above the lower end of said casing and an elongated cement flow directing means secured to said liner above said port and extending downwardly and completely therearound to a point substantially below said port and adjacent said flow control means, said directing means comprising a rigid sleeve concentrically secured to said liner above said port and making a fluid tight joint therewith and spaced from said liner and open at its lower end to discharge fluid cement downwardly around the liner.

2. The combination according to claim 1 in which said flow control means comprises an upwardly concave cup of resilient material surrounding said liner.

3. The combination according to claim 1 in which said flow directing means comprises a concentric sleeve extending downwardly around said liner to a point at least about 5 feet below said port.

4. The combination with a well liner positioned in a well bore and extending from a point above the lower end of an already-cemented well casing to a point below the lower end of the casing, of flow control means secured on the outside of said liner at a level above the lower end of the casing for permitting fluid flow upwardly through the casing around said liner and for preventing downward fluid flow therearound, a port in said liner longitudinally spaced above said flow control means, and an elongated cement flow directing means secured to said liner and extending from above said port downwardly along said liner over said port and terminating within the casing adjacent said flow control means, said directing means being secured to said liner to make a fluid tight joint therewith and forming with said liner a continuous passageway open at its lower end through which cement from said port is discharged downwardly along the liner and is retained within said casing by said flow control means to form a seal between the overlapping portions of said liner and casing.

5. The combination according to claim 4 in which said flow control means comprises an upwardly concave cup of resilient material surrounding said liner.

6. A method of cementing a liner in a well bore having an already-cemented well casing therein into which the upper end of said liner extends comprising the steps of selectively sealing the lower end of the annular space between said liner and said casing to permit upward fluid flow and prevent downward fluid flow through such annular space, introducing a settable sealing material such as cement between said liner and said well bore at a level substantially below the lower end of said casing to cause the displacement upwardly of well fluid between said liner and the well bore and through the annular space between said liner and said casing, permitting said sealing material to set, passing additional sealing material outwardly from said liner into the annular space between the overlapping portions of said liner and said casing and downwardly along said liner to a level adjacent the seal and then directing the sealing material upwardly to substantially fill said annular space.

GEORGE A. COLLINS.
JOHN R. RUSSELL.
FRANCIS L. COLAHAN.

REFERENCES CITED

The following references are of record in the file of this patent:

UNITED STATES PATENTS

| Number | Name | Date |
|---|---|---|
| 911,649 | Elsey | Feb. 6, 1909 |
| 1,839,709 | Smith | Jan. 5, 1932 |
| 2,054,353 | Yowell | Sept. 15, 1936 |
| 2,173,034 | Armentrout et al. | Sept. 12, 1939 |
| 2,191,750 | Brown | Feb. 27, 1940 |
| 2,214,555 | Hayward et al. | Sept. 10, 1940 |
| 2,360,311 | Ausburn et al. | Oct. 17, 1944 |
| 2,411,260 | Glover et al. | Nov. 19, 1946 |
| 2,431,751 | Hayward | Dec. 2, 1947 |